(12) United States Patent
Belpanno et al.

(10) Patent No.: US 9,669,466 B1
(45) Date of Patent: Jun. 6, 2017

(54) LARGE-CAPACITY SPINDLE ASSEMBLIES AND COLLETS FOR USE IN DAVENPORT MULTI-SPINDLE SCREW MACHINES

(71) Applicant: Brinkman Products, Inc., Rochester, NY (US)

(72) Inventors: Sandro G. Belpanno, Spencerport, NY (US); James P. Hugick, Rochester, NY (US); Paul P. Francia, Rochester, NY (US)

(73) Assignee: Brinkman Products, Inc., Rochester, NY (US)

( * ) Notice: Subject to any disclaimer, the term of this patent is extended or adjusted under 35 U.S.C. 154(b) by 0 days.

(21) Appl. No.: 15/087,381

(22) Filed: Mar. 31, 2016

(51) Int. Cl.
| | |
|---|---|
| *B23B 9/00* | (2006.01) |
| *B23B 5/08* | (2006.01) |
| *B23B 13/12* | (2006.01) |
| *B23B 13/04* | (2006.01) |
| *B23B 31/20* | (2006.01) |

(52) U.S. Cl.
CPC ............. *B23B 9/005* (2013.01); *B23B 5/08* (2013.01); *B23B 13/04* (2013.01); *B23B 13/125* (2013.01); *B23B 31/201* (2013.01)

(58) Field of Classification Search
CPC  B23B 31/207; B23B 7/00; B23B 7/02; B23B 7/12; B23B 13/02; B23B 13/04; B23B 13/123; B23Q 1/70; B23Q 1/703
See application file for complete search history.

(56) References Cited

U.S. PATENT DOCUMENTS

| | | | | |
|---|---|---|---|---|
| 2,035,942 | A * | 3/1936 | Brinkman | B23B 13/123 279/20.1 |
| 2,071,138 | A * | 2/1937 | Nolan | B23B 13/123 279/146 |
| 3,095,771 | A * | 7/1963 | Vann | B23B 13/121 226/11 |
| 3,125,913 | A * | 3/1964 | Smrekar | B23B 13/123 226/149 |
| 3,372,450 | A * | 3/1968 | Worrell | B23B 7/04 29/40 |
| 3,910,476 | A * | 10/1975 | Zajac | B23B 13/024 226/158 |
| 4,014,558 | A * | 3/1977 | Brinkman | B23B 31/207 279/50 |
| 4,130,289 | A * | 12/1978 | Zajac | B23B 13/024 226/158 |
| 2006/0018580 | A1* | 1/2006 | Belpanno | B23B 9/005 384/490 |

* cited by examiner

*Primary Examiner* — Will Fridie, Jr.
(74) *Attorney, Agent, or Firm* — Phillips Lytle LLP

(57) ABSTRACT

An improved spindle assembly for a Davenport® multi-axis screw machine is adapted to adequately hold one-inch round bar-stock in a collet against movement relative thereto attributable to machining operations performed on a cantilevered length of bar-stock held in and extending beyond the collet. The spindle assembly may permit the use of the screw machine on materials thought heretofore to be too difficult to machine on a screw machine. Cam surfaces on the inner spindle and collet may be coated with a low-friction material. A stress-relieving connection between the inner spindle and collet is provided.

39 Claims, 3 Drawing Sheets

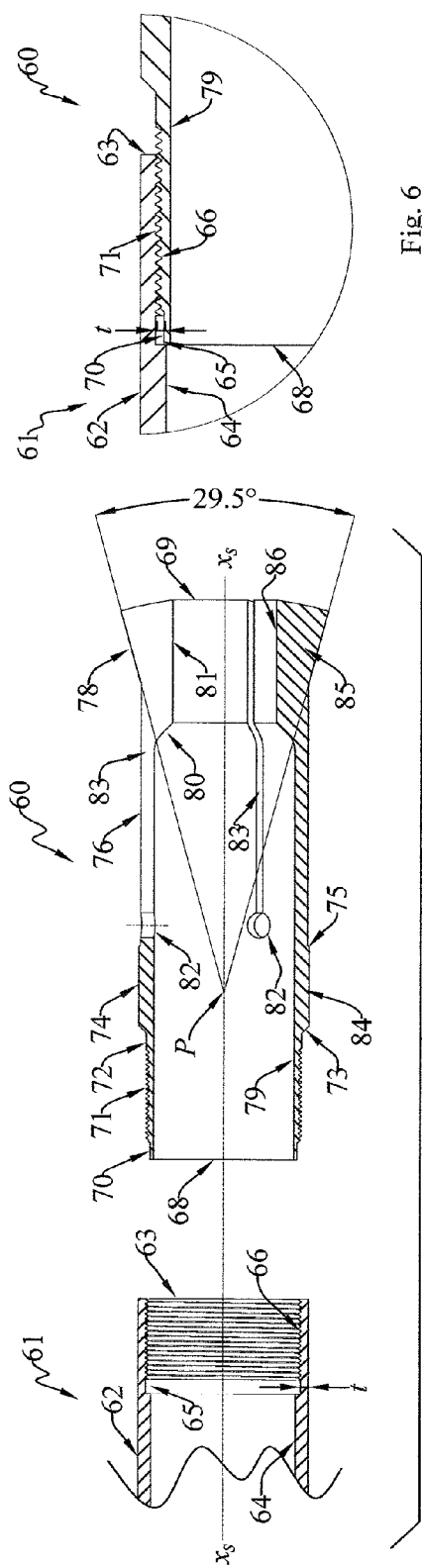
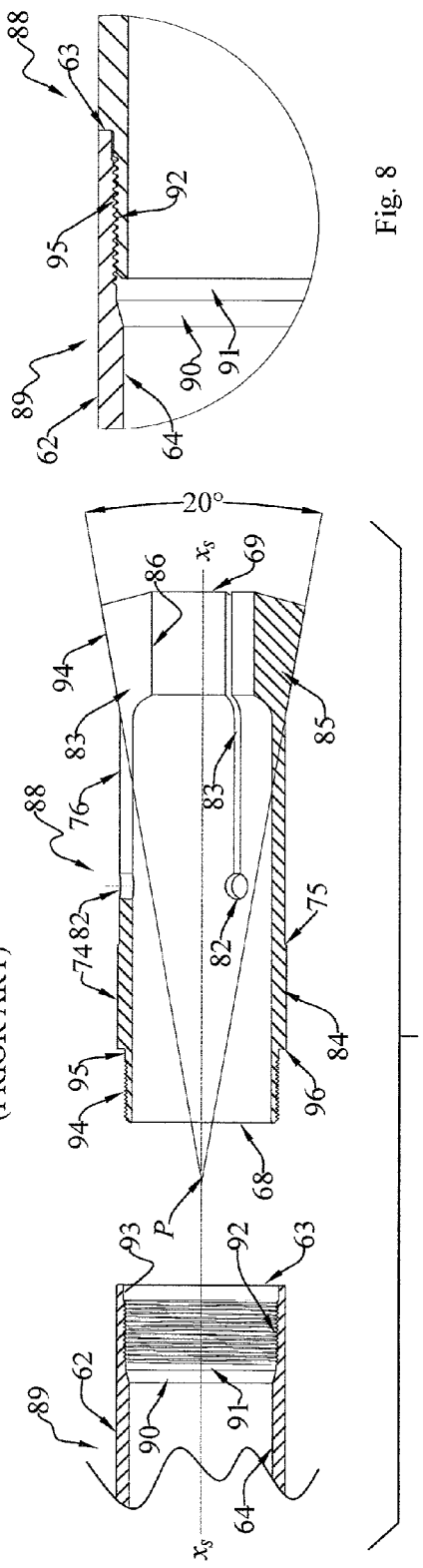

LARGE-CAPACITY SPINDLE ASSEMBLIES AND COLLETS FOR USE IN DAVENPORT MULTI-SPINDLE SCREW MACHINES

TECHNICAL FIELD

The present invention relates generally to multi-spindle screw machines, and, more particularly, to improved large-capacity spindle assemblies and collets for use in Davenport® multi-spindle screw machines.

BACKGROUND ART

A screw machine is an automated machine tool for machining a wide variety of parts from bar-stock. The bar-stock may have round, square or polygonal transverse cross-sections, and may be supplied to the screw machine with initial axial lengths on the order of ten to twelve feet. The screw machine typically has a head rotatably mounted on a supporting frame. The head is controllably indexable through a plurality of successive angular positions. A plurality of circularly-spaced spindle assemblies are mounted on the head for rotation with the head about the head axis, and for rotation relative to the head about the various individual spindle assembly axes. Lengths of bar-stock are supplied axially to each spindle assembly, and rotate with the head assembly about the head axis. Hence, the rotatable head and the bar-stock supplied to the various spindle assemblies mounted on the head somewhat resembles a Gatling gun in outward appearance. The screw machine is adapted to perform a plurality of machining operations on cantilevered lengths of bar-stock that are held by and extend beyond the spindle assemblies at the various angular positions of the head.

Each spindle assembly typically has a rotatable outer spindle mounded on the head, and is elongated along a spindle axis that is parallel to the head axis. Each outer spindle has an inwardly- and forwardly-facing frusto-conical cam surface. An inner spindle is arranged within the outer spindle for rotation with the outer spindle about the spindle assembly axis, and is mounted for limited axial movement relative to the associated outer spindle. A spindle-moving means or mechanism is operatively arranged to exert a force on the inner spindle to controllably move the inner spindle in one axial direction relative to the outer spindle. A collet is mounted on the inner spindle for movement therewith. The collet has a plurality of fingers that extend forwardly from a body. These fingers have angularly-segmented outwardly- and rearwardly-facing frusto-conical cam surfaces that engage the inwardly-facing cam surface on the associated outer spindle. Each finger has a pad that is adapted to be moved radially inwardly to engage a penetrant portion of the bar-stock when the inner spindle is moved in such one axial direction relative to the outer spindle. When the spindle-moving mechanism releases the force on the inner spindle, the inner spindle moves in the opposite axial direction relative to the outer spindle, and the collet fingers are permitted to move radially outwardly (i.e., to spring back toward their original positions) such that the collet pads will to disengage from and release the bar-stock.

A feed tube is arranged within the inner spindle for rotation within the inner spindle about the spindle assembly axis, and for axial movement relative thereto. The feed tube has a plurality of feed fingers that are adapted to engage a length of penetrant bar-stock within the feed tube. A feed tube moving means or mechanism is provided for selectively causing the feed tube and feed fingers to selectively reciprocate in either axial direction (i.e., forwardly and rearwardly) relative to the inner spindle. Such movement of the feed tube is coordinated with operation of the collet so that the feed fingers may advance the bar-stock forwardly toward and through the collet when the collet fingers have moved radially away from the workpiece such that the collet is open. When the collet is closed, the feed tube is moved rearwardly away from the collet, with the feed fingers sliding along the bar-stock held in the closed collet.

One particular type of screw machine is the Davenport® five-spindle screw machine. Davenport® is a registered trademark of Brinkman Products, Inc., 167 Ames Street, Rochester, N.Y. 14611, and the parent company of Davenport Machine, Inc. of the same address. The original Davenport® machines were developed in the late 19th Century and early 20th Century. These machines had a number of cutting and forming tools mounted on the frame and operatively arranged to engage the cantilevered lengths of bar-stock held by and extending beyond the collets of the spindle assemblies. Over the years, the performance of the early Davenport® machines has been improved by the addition of servo control, man-machine interface control, improved heads, high precision heads, and the like. Many early-version and remanufactured Davenport® machines are still in service today.

The spindle assemblies of such Davenport® machines are removably mounted on the head so that they can be repaired or replaced, as necessary. The spindle assemblies of the early Davenport® machines were sized to handle ⅝-inch diameter round bar-stock, and polygonal bar-stock that fit closely within the outer transverse profile of such ⅝-inch diameter round bar-stock. This was the "regular" capacity of the early Davenport® spindle assemblies. Later models had "oversized" spindle assemblies that could handle ¹³⁄₁₆-inch diameter round bar-stock, and polygonal bar stock that fit closely within the outer transverse profile of such ¹³⁄₁₆-inch round bar-stock. To do this, the radial thicknesses of the various spindle assembly components (i.e., the outer spindle, the inner spindle and collet, the feed tube and feed fingers, etc.) were "thinned out" in a radial direction to accommodate the larger size of such ¹³⁄₁₆-inch round bar-stock. These larger-capacity spindle assemblies were known as the "oversized" Davenport® spindle assemblies. However, both versions still had to fit within the original bores provided in the head. Hence, the outer envelopes of the spindle assemblies had to be the same to fit within the standard head openings.

In both the "regular" and "oversized" spindle assembly versions, the collet seat angle (i.e., the included angle of the facing cam surfaces with respect to the longitudinal axis of the spindle assembly) was about 29.5°. This worked reasonably well for softer bar-stock materials (e.g., bronzes, aluminum, some steels, and the like). In other words, the 29.5° collet seat angle was reasonably adequate to hold the cantilevered bar-stock that extended axially beyond the collet (i.e., the workpiece) against rotational and axial movement when the workpiece was subjected to the machining operations at the various angular positions of the head. This was true for both the "regular" and "oversized" spindle versions, even though the latter had been radially "thinned out" to accommodate the larger-diameter bar-stock. Even the "oversized" version generally had sufficient strength and rigidity to permit machining of cantilevered workpieces when used with such softer ¹³⁄₁₆-inch round bar-stock materials.

However, bar-stock of harder materials was heretofore considered to be too difficult to machine on a screw machine. The principal reason for this was that the 29.5° collet seat angle was insufficient to adequately hold the cantilevered workpiece in the collet against rotational and axial movement relative thereto when such harder materials were subjected to increased forces attributable to the machining operations. This problem was exacerbated with the "oversized" spindle assemblies, in which the internal components were radially "thinned out", because the "oversized" version lacked sufficient strength and rigidity to resist the greater forces attributable to such machining operations.

The American Iron & Steel Institute ("AISI"), of 25 Massachusetts Avenue, Suite 800, Washington, D.C. 20001, publishes a "machinability rating" for many engineering materials. This rating is derived from a series of mechanical tests, and compares the ease at which a particular material machines to an arbitrary standard benchmark under identical machining conditions. The "machinability rating" is determined by measuring the weighted averages of normal cutting speed, surface finish, and tool life for each material, and is affected by the physical properties (e.g., yield strength, abrasiveness, hardness, chemistry, microstructure, etc.) of the material. AISI has chosen B-1112 steel @ 160 Brinell hardness as that benchmark, and has assigned it a "machinability rating" of 100%.

Materials that have an AISI "machinability rating" of less than 30% have generally been considered as unsuitable for production use on a Davenport® multi-spindle screw machine. Examples of various metals and their respective "machinability ratings" are provided in the following table:

| Grade/Alloy | Approx. Surf. Ft./Min. | AISI "Machinability Rating" (% rel. speed based on B-112 as 100%) |
| --- | --- | --- |
| C-1018 | 130 | 78 |
| C-1117 | 150 | 91 |
| C-1144 | 125 | 76 |
| 302 | 70 | 40 |
| 310 | 60 | 36 |
| 316 | 60 | 36 |
| 330 | 45 | 20 |
| 431 | 80 | 48 |
| Nickel 200 | 110 | 66 |
| Inconel ® 600 | 50 | 22 |
| Inconel ® 718 | 20 | 12 |
| Waspalloy ® | 45 | 20 |
| Hastelloy ® C | 40 | 18 |
| Hasteloy ® X | 45 | 20 |

[Inconel ® is a registered trademark of Huntington Alloys Corp., 3200 Riverside Drive, Huntington, W.Va. 25705. Hastelloy ® is a registered trademark of Hayes International, Inc., P.O. Box 9013, 1020 West Park Avenue, Kokomo, Ind. 46904. Waspaloy ® is reportedly a registered trademark of United Technologies Corp.]

The frequent tool changes, adjustments, and general difficulty in keeping sharp tools capable of producing the tight tolerances and fine finishes expected of these machines, negates the benefit of high-volume machining. As the "machinability rating" goes down, the tooling forces generated by the cutting tools generally go up. The problem becomes more pronounced when low-machinability materials are combined with dimensionally-larger workpieces. The forces to hold the larger workpiece under the large cutting forces generated by larger tools becomes greater than the standard work-holding collets can provide.

Around 1985, Davenport Machine, Inc. attempted to manufacture a still-larger capacity spindle assembly that would handle one-inch round bar-stock of softer materials, and polygonal bar-stock that fit closely within the outer transverse profile of such one-inch round bar-stock. The collet seat angle remained at 29.5°, and the internal components of the spindle assembly were redimensioned to accommodate one-inch diameter round bar-stock, all while keeping the confines of the spindle assembly within the outer envelope that would still fit within the head openings. Only one such machine was built and sold commercially in the hope that it could be used to machine workpieces from one-inch round bar-stock of soft material. This machine did not work as desired, and was decommissioned after several months of attempts to make it work on such larger-diameter one-inch round bar-stock. It was unable to hold machining tolerances like those of the original "regular" and "oversized" capacity Davenport® machines. The reason for the failure is thought to have been attributable to the increased machining forces that were exerted during the machining operations on the cantilevered one-inch diameter workpieces, the inability to adequately hold the one-inch bar-stock in the collet, and the reduced structural strength and rigidity of the various spindle components to resist increased machining forces on the workpiece.

Accordingly, there is believed to be a need for an improved spindle assemblies for multi-spindle screw machines generally, and the Davenport® multi-axis screw machines in particular, that will have adequate strength and rigidity to enable the use of such screw machines: (1) with some materials heretofore thought as being too difficult to machine, (2) with bar-stock having up to and including one-inch round bar-stock, and polygonal bar-stock that fits closely within the outer transverse profile of such one-inch round bar-stock, (3) that will have inner components that are better designed to enhance rigidity and stiffness, and that are designed to reduce fatigue stresses, and (4) that will adequately hold the bar-stock within the collet against relative rotational and axial movement during machining operations on the workpiece.

DISCLOSURE OF THE INVENTION

With reference to the corresponding parts, portions or surfaces of the disclosed embodiment(s), merely for purposes of illustration and not by way of limitation, the present invention provides, in one aspect, an improved spindle assembly for a Davenport® multi-axis screw machine having a head rotatably mounted on a frame and being adapted to be angularly indexed through a plurality of successive angular positions and having a plurality of circularly-spaced spindle assemblies mounted on the head, the screw machine being adapted to perform a plurality of machining operations on cantilevered lengths of bar-stock held by the spindle assembles, each spindle assembly comprising: a rotatable outer spindle having an inwardly-facing cam surface; an inner spindle coaxially arranged within the outer spindle for rotation with the outer spindle, and mounted for selective axial movement relative to the outer spindle; a collet mounted on the inner spindle for movement therewith, the collet having an outwardly-facing cam surface engaging the outer spindle cam surface and having a plurality of circularly-spaced fingers adapted to be moved radially inwardly when the inner spindle is moved in one axial direction relative to the outer spindle; spindle-moving means for selectively moving the inner spindle in the one axial direction relative to the outer spindle; a feed tube arranged within the inner spindle for axial movement relative to the inner spindle, the feed tube having a plurality of feed fingers that are adapted to engage a length of bar-stock within the feed tube; feed-tube-moving means for selectively moving the feed tube and feed fingers in either axial direction relative to the inner spindle; wherein the movement of the feed tube is adapted to be coordinated with the relative movement of the collet fingers such that the feed fingers may advance the bar-stock forwardly toward the collet when the collet is open; and wherein the spindle assembly is operatively adapted to adequately hold one-inch round bar-stock in the collet against axial and rotational movement relative thereto attributable to machining operations performed on a cantilevered length of the bar-stock extending beyond the collet.

The spindle assembly may be operatively adapted to hold polygonal bar-stock that fits closely within the transverse profile of the one-inch round bar-stock.

The bar-stock may include some metals heretofore considered too difficult to machine on a screw machine (i.e., those materials having an AISI "machinability rating" of less than 30%).

The collet seat angle between the cam surfaces may be greater than 7° and less than or equal to 25°, and preferably about 20°±0.5°.

One of the inner and outer spindle cam surfaces may be coated with a low-friction material. The coefficient of friction between the coated and uncoated cam surfaces may be about 0.15.

In the preferred embodiment, both of the inner and outer spindle cam surfaces are coated with a low-friction material. The coefficient of friction between the coated cam surfaces may be about 0.09.

In another aspect, the invention provides an improved spindle assembly for a Davenport® multi-axis screw machine having a head rotatably mounted on a frame and being adapted to be angularly indexed through a plurality of successive angular positions and having a plurality of circularly-spaced spindle assemblies mounted on the head, the screw machine being adapted to perform a plurality of machining operations on cantilevered lengths of bar-stock held by the spindle assembles, each spindle assembly comprising: a rotatable outer spindle having an inwardly-facing cam surface; an inner spindle coaxially arranged within the outer spindle for rotation with the outer spindle, and mounted for selective axial movement relative to the outer spindle; a collet mounted on the inner spindle for movement therewith, the collet having an outwardly-facing cam surface engaging the outer spindle cam surface and having a plurality of circularly-spaced fingers adapted to be moved radially inwardly when the inner spindle is moved in one axial direction relative to the outer spindle; spindle-moving means for selectively moving the inner spindle in the one axial direction relative to the outer spindle; a feed tube arranged within the inner spindle for axial movement relative to the inner spindle, the feed tube having a plurality of feed fingers that are adapted to engage a length of bar-stock within the feed tube; feed-tube-moving means for selectively moving the feed tube and feed fingers in either axial direction relative to the inner spindle; wherein the movement of the feed tube is adapted to be coordinated with the relative movement of the collet fingers such that the feed fingers may advance the bar-stock forwardly toward the collet when the collet is open; and wherein the spindle assembly is operatively adapted to adequately hold bar-stock formed of some materials heretofore considered too difficult to machine in a screw machine.

The spindle assembly may be operatively adapted to adequately hold one-inch round bar-stock in the collet against axial and rotational movement relative thereto attributable to machining operations performed on a cantilevered length of the bar-stock extending beyond the collet.

The spindle assembly may be operatively adapted to hold polygonal bar-stock that fits closely within the transverse profile of the one-inch round bar-stock.

The collet seat angle between the cam surfaces may be greater than 7° and less than or equal to 25°. In the preferred embodiment, the collet seat angle may be about 20°±0.5°.

One of the inner and outer spindle cam surfaces may be coated with a low-friction material. The coefficient of friction between the coated and uncoated cam surfaces may be about 0.15.

In a preferred form, both of the inner and outer spindle cam surfaces may be coated with a low-friction material. The coefficient of friction between the two coated cam surfaces may be about 0.09.

In another aspect, the invention provides an improvement in a Davenport® multi-axis screw machine having a head rotatably mounted on a frame and being adapted to be angularly indexed between a plurality of successive angular positions and having a plurality of circularly-spaced spindle assemblies mounted on the head, the screw machine being adapted to perform a plurality of machining operations on cantilevered lengths of bar-stock held by the spindle assembles, the screw machine having a rotatable outer spindle having an inwardly-facing cam surface, having an inner spindle arranged within the outer spindle for rotation with the outer spindle and mounted for selective coaxial movement relative to the outer spindle, having a collet mounted on the inner spindle for movement therewith, the collet having an outwardly-facing cam surface engaging the outer spindle cam surface and having a plurality of circularly-spaced fingers adapted to be moved radially inwardly when the cam surfaces engage one another and the inner spindle is moved in one axial direction relative to the outer spindle, and having spindle-moving means for selectively moving the inner spindle in the one axial direction relative to the outer spindle. The improvement comprises: the collet seat angle between the inner and outer spindle cam surfaces being greater than 7° and less than or equal to 25° so as to adequately hold any bar-stock in the collet against axial and rotational movement relative thereto attributable to machining operations performed on a cantilevered portion of the bar-stock extending beyond the collet.

In a preferred embodiment, the collet seat angle is about 20°.

In one form, the bar-stock may include up to and including ⅝-inch round bar-stock. In another form, the bar-stock may include up to and including 13/16-inch round bar-stock. In still another form, the bar-stock may include up to and including one-inch round bar-stock, and polygonal bar-stock that closely fits within the transverse profile of such one-inch round bar-stock.

The bar-stock may include some materials heretofore considered too difficult to machine on a screw machine.

One of the inner and outer spindle cam surfaces may be coated with a low-friction material. The coefficient of friction between the coated and uncoated cam surfaces may be about 0.15.

In another form, both of the inner and outer spindle cam surfaces are coated with a low-friction material. The coefficient of friction between the two coated cam surfaces may be about 0.09.

In still another aspect, the invention provides an improved Davenport® multi-axis screw machine having a collet adapted to be selectively mounted on a spindle; the spindle having: a forwardly-facing end face, a cylindrical outer surface extending rearwardly from the outer margin of spindle end face, an internally-threaded portion extending rearwardly from the inner margin of the spindle end face, an inner cylindrical surface axially spaced from the spindle threaded portion, a radially-thickened portion of the spindle being defined between the spindle inner and outer cylindrical surfaces; the collet having: a rearwardly-facing end face, an externally-threaded portion extending forwardly from the outer margin of the collet end face, a rearwardly-facing shoulder surface, an outer cylindrical surface extending forwardly from the shoulder surface, and an inner cylindrical surface extending forwardly from the inner margin of the collet end face. The improvement comprises: the spindle having a frusto-conical surface extending forwardly and outwardly from the spindle inner cylindrical surface.

The improvement may further include: an inwardly-facing rear cylindrical surface extending forwardly from the outer margin of the frusto-conical surface to join the rear margin of the spindle threaded surface.

The improvement may further include: an inwardly-facing forward cylindrical surface extending forwardly from the forward margin of the spindle threaded surface to join the inner margin of the spindle end face.

The collet may be adapted to be threaded onto the spindle until the spindle end face abuts the collet shoulder.

The collet end face may not bear against any portion of the spindle when the collet is threaded into engagement with the spindle.

The diameters of the spindle and collet outer cylindrical surfaces may be substantially the same.

The diameters of the spindle and collet inner cylindrical surfaces may be substantially the same.

In a preferred embodiment, the spindle and collet threaded portions have a UNJ thread form.

Accordingly, the general object of the invention is to provide an improved spindle assembly for a Davenport® multi-axis screw machine that is operatively adapted to adequately hold one-inch round bar-stock in the collet against axial and rotational movement relative thereto attributable to machining operations performed on a cantilevered length of said bar-stock held within and extending beyond the collet.

Another object is to provide an improved spindle assembly for a Davenport® multi-axis screw machine operatively adapted to adequately hold bar-stock of some materials heretofore considered too difficult to machine on a screw machine (i.e., those having an AISI "machinability rating" of less than 30%).

Another object is to provide an improved Davenport® multi-axis screw machine, wherein the improvement comprises: the collet seat angle between the inner and outer spindle cam surfaces being greater than 7° and less than or equal to 25° so as to adequately hold bar-stock in the collet against axial and rotational movement relative thereto attributable to machining operations performed on a cantilevered portion of the bar-stock extending beyond the collet.

Still another object is to provide an improved Davenport® multi-axis screw machine, wherein the improvement comprises: a frusto-conical surface transitioning two surfaces on the inner spindle, in lieu of the stress-concentrating undercut that had existed in earlier inner spindle versions.

These and other objects and advantages will become apparent from the foregoing and ongoing written description, the drawings and the appended claims.

BRIEF DESCRIPTION OF THE DRAWINGS

FIG. 5 is an enlarged fragmentary longitudinal vertical sectional view of the collet of the 1985 Davenport® one-inch spindle assembly in exploded aligned relation to the forward marginal end portion of the inner spindle.

FIG. 6 is a further-enlarged fragmentary longitudinal vertical sectional view of the collet shown in FIG. 5 as being operatively mounted on the forward marginal end portion of the inner spindle shown in FIG. 5.

FIG. 7 is an enlarged fragmentary longitudinal vertical sectional view of an improved spindle assembly showing an improved collet in exploded aligned relation to the forward marginal end portion of an improved inner spindle.

FIG. 8 is a further-enlarged fragmentary longitudinal vertical sectional view of the improved spindle assembly shown in FIG. 7, with the improved collet being operatively mounted on the forward marginal end portion of the improved inner spindle.

DESCRIPTION OF THE PREFERRED EMBODIMENTS

Figures 1, 2:
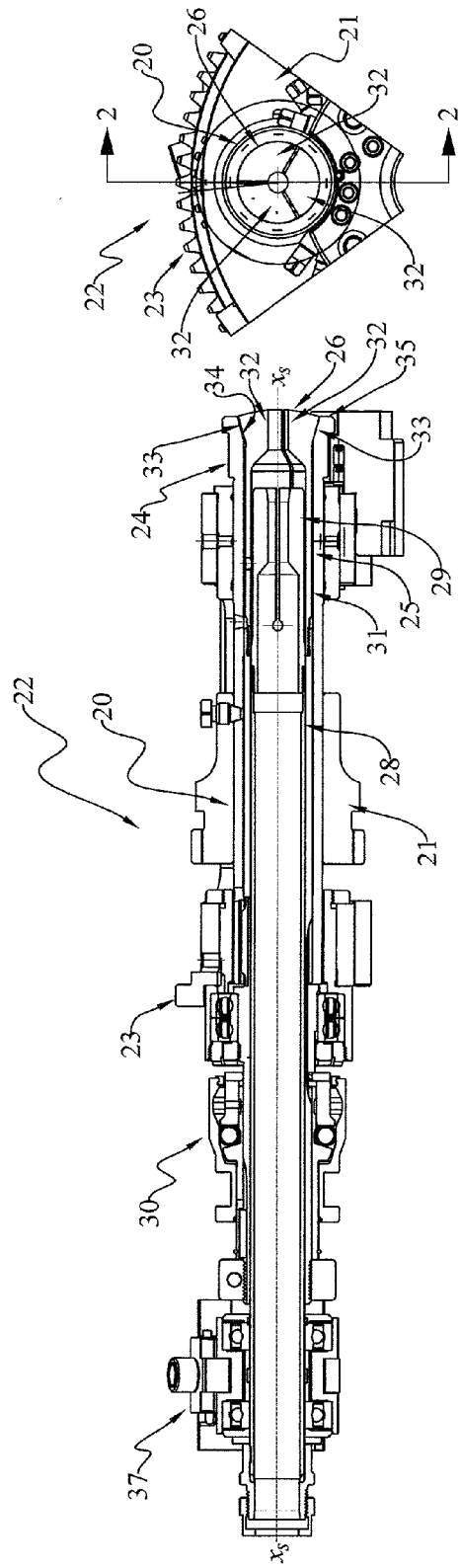
FIG. 1 is a fragmentary end view of a portion of a prior art Davenport® multi-axis screw machine showing one of the prior art "oversized" spindle assemblies as being mounted on the head.
FIG. 2 is a fragmentary longitudinal vertical sectional view (without cross-hatching) of the prior art "oversized" spindle assembly shown in FIG. 1, this view being taken generally on line 2-2 of FIG. 1.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 3:
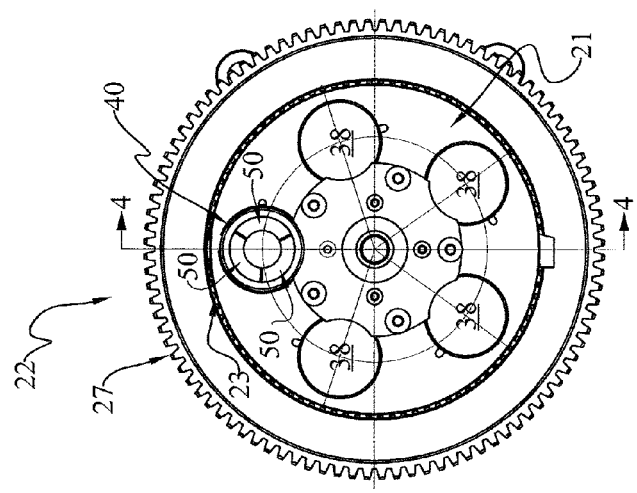
FIG. 3 is a fragmentary end view of a portion of an improved Davenport® multi-axis screw machine showing one of the improved spindle assemblies in the 12:00 o'clock position as being mounted on the head, this view also showing the openings in the head to accommodate the other improved spindle assemblies.
Figure 4:
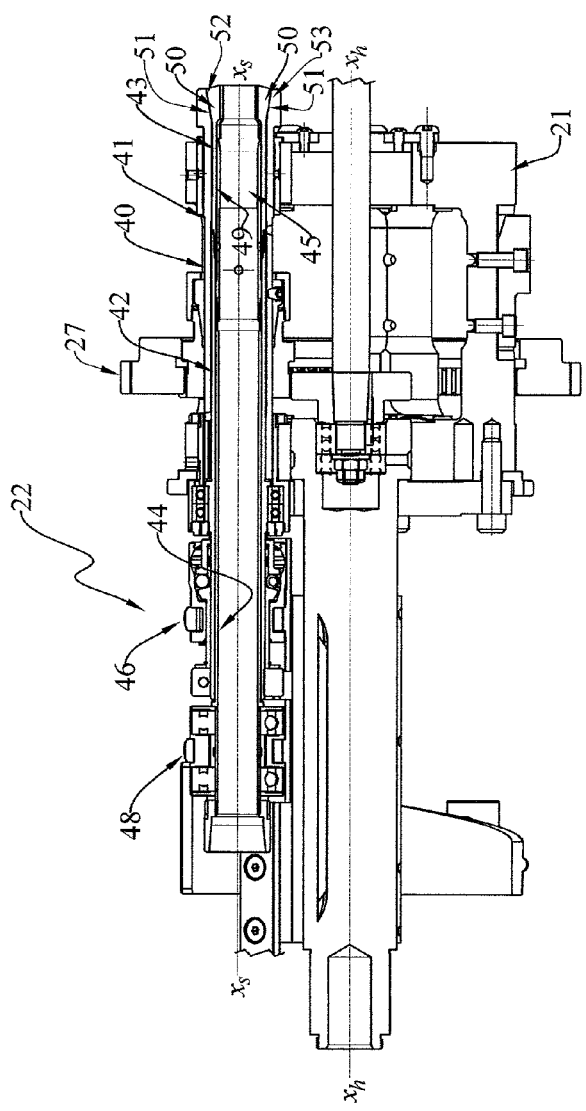
FIG. 4 is a fragmentary longitudinal vertical sectional view (without cross-hatching) of the improved spindle assembly shown in FIG. 3, this view being taken generally on line 4-4 of FIG. 3.

Referring now to the drawings, a prior art "oversized" spindle assembly is shown as being mounted on a head in FIGS. 1-2, an improved spindle assembly is shown as being mounted on a head in FIGS. 3-4, portions of a prior art 1985 one-inch spindle assembly are shown in FIGS. 5-6, and portions of an improved spindle assembly are shown in FIGS. 7-8. For the reader's convenience, the content of these various drawing figures will be considered seriatim herebelow.

Prior Art "Oversized" Spindle Assembly (FIGS. 1-2)

Referring now to FIG. 1, a prior art "oversized" spindle assembly, generally indicated at 20, is shown as being mounted on a fragmentary portion of the head, generally indicated at 21, of a Davenport® multi-axis screw machine, generally indicated at 22.

The screw machine is generally known in the prior art. Hence, the description thereof will be somewhat abbreviated to avoid obfuscating the improved spindle assemblies and collets which constitute the present invention.

The head 21 of the Davenport® screw machine is mounted on a suitable supporting frame (not shown), and is adapted to be rotatably indexed relative to the frame between five successive angular positions. These angular positions are circularly spaced from one another at equal intervals of 72°. In FIG. 1, the "oversized" spindle assembly 20 is shown as being mounted on the head in the 12:00 o'clock position. The positions of the other spindle assemblies on the head are not shown in FIG. 1. However, the head openings therefor may be seen in FIG. 4. The head has number of gear teeth 23 which engage other structure (not shown), by means of which the spindle assembly may be rotatably indexed on the head.

Referring now to FIG. 2, the prior art "oversized" spindle assembly 20 is shown as being mounted on the head 21 for rotation about a horizontal spindle assembly axis $x_s$-$x_s$. Proceeding radially inwardly in FIG. 2, the "oversized" spindle assembly is shown as having, in pertinent part, a horizontally-elongated outer spindle 24 mounted for rotation relative to the head, a horizontally-elongated inner spindle 25 arranged within the outer spindle, a collet 26 mounted on the right marginal end portion of the inner spindle, a feed tube 28 arranged within the inner spindle, and a plurality of feed fingers 29 mounted on the feed tube to engage a penetrant portion of bar-stock (not shown) therewithin.

The outer spindle, the inner spindle and the feed tube are severally generated about spindle assembly axis $x_s$-$x_s$. The outer spindle 24 is mounted on the head for rotational movement with the head about head axis $x_h$-$x_h$ (see FIG. 4), and for rotational movement about spindle assembly axis $x_s$-$x_s$. The inner spindle 25 is mounted within the outer spindle for rotation with the outer spindle, and for limited axial movement relative to the outer spindle along spindle axis $x_s$-$x_s$. A spindle-moving means, generally indicated at 30, acts between the head and the inner spindle for selectively moving the inner spindle in one axial direction (i.e., leftwardly in FIG. 2) relative to the outer spindle. The feed tube moving means, generally indicated at 37, acts between the head and the feed tube, for selectively causing the feed tube and feed fingers to reciprocate axially within the inner spindle. The collet 26 is shown as being a horizontally-elongated tubular member having a leftward body 31, and having three circularly-spaced fingers, severally indicated at 32, extending rightwardly therefrom. The three collet fingers have outwardly- and rearwardly-facing frusto-conical cam surfaces, severally indicated at 33, on their outer surfaces, that are arranged to engage an inwardly- and rightwardly-facing frusto-conical cam surface 34 adjacent the right end face 35 of the outer spindle.

The collet seat angle (i.e., the nominal angle of the frusto-conical cam surfaces of the "regular" and "oversized" spindle assemblies with respect to the spindle axis) was about 29.5°.

When the inner spindle is moved axially leftwardly within the outer spindle, as seen in FIG. 2, the engaged cam surfaces 33, 34 urge the collet fingers 32, 32, 32 to move radially inwardly to cause the collet pads (i.e., the inner cylindrically-segmented surfaces on the collet fingers) to engage, bear against and hold a length of penetrant bar-stock (not shown) therewithin. On the other hand, when the force exerted by the spindle moving means is released, the inwardly-biased collet fingers will urge the inner spindle to move rightwardly relative to the outer spindle (as seen in FIG. 2) so that the collet fingers may move radially outwardly to open the collet and release the length of bar-stock held by and between the collet pads therein. Thus, the collet fingers are forced to move radially inwardly when the inner spindle is moved leftwardly relative to the outer spindle, but are permitted to spring back (i.e., move radially outwardly) when the force urging the inner spindle to move leftwardly within the outer spindle is subsequently released. The operation of the feed tube moving means 37 is coordinated with the operation of the collet so that the feed fingers will advance the bar-stock rightwardly toward the collet when the collet is open, and will slide leftwardly along the bar-stock after the collet has been closed. Thus, the reciprocable feed tube and feed fingers could be used, in cooperation with the operation of the collet, to progressively advance the bar-stock along the axis of the spindle assembly in a ratchet-like manner.

As previously noted, the head 21 of the Davenport® screw machine was adapted to be rotatably indexed in one angular direction through five successive angular positions. These positions were separated by intervals of 72°. Thus, for example, if the first position was at 0° and the direction of rotation was clockwise (as seen in FIG. 2), the second would be at 72°, the third at 144°, the fourth at 216°, and the fifth at 288°. The next position would be 360°, or 0°, and the indexing motion would repeat itself.

Various cutting or forming tools (not shown) were operatively mounted on the Davenport® machine to perform various machining operations on a cantilevered length of bar-stock held by and extending beyond the closed collet (i.e., the workpiece) of each spindle assembly at each of the five angularly-spaced stations. For example, at the first station, a milling operation might be performed on the workpiece. The head would be indexed to the second station, where a drilling operation might be performed on the milled workpiece. At the same time, the milling operation might be performed on a new workpiece presented in the first station. The head would then be indexed to the third station, and a tapping operation might be performed on the milled and drilled workpiece. At the same time, a new workpiece would be presented at the first station, and the workpiece that was milled at the first station would be indexed to the second station, and so on. These various machining operations were performed successively on cantilevered workpieces held in the collets of the various spindle assemblies. As these various machining operations were performed, forces were exerted on the cantilevered workpiece that urged the penetrant length of bar-stock held within the collet to move axially and/or rotatively relative to the collet. The magnitude of these forces was a function of many factors, such as the feed rates of the machine tools on the workpiece, the hardness of the bar-stock material itself, the strength and rigidity of the spindle assembly to resist deflection caused by the forces exerted on the workpiece, and the like. While screw machines were commonly used on softer materials (i.e., those having an AISI "machinability rating" equal to or greater than 30%), some harder materials (i.e., those having an AISI "machinability rating" of less than 30%) were simply regarded as being too difficult to machine on a screw machine. The reasons for this included factors such as the forces exerted on the workpiece caused axial and/or rotative movement of the bar-stock in the collet, or caused chattering of the tool on the workpiece, and the like.

The standard or "regular" Davenport® spindle assembly was sized to accommodate and handle ⅝-inch diameter round bar-stock and polygonal bar-stock that fit closely within the outer transverse profile of such ⅝-inch diameter round bar-stock. Later models had "oversized" spindle assemblies that could handle ¹³⁄₁₆-inch diameter round bar-stock, and polygonal bar stock that fit closely within the outer transverse profile of such ¹³⁄₁₆-inch round bar-stock. To do this, the various spindle assembly components (i.e., the outer spindle, the inner spindle and collet, the feed tube and fingers, etc.) were "thinned out" in a radial direction to accommodate the larger size of such ¹³⁄₁₆-inch round bar-stock. This was done at the expense of the strength and rigidity of the components of the spindle assemblies.

1985 Spindle Assemblies in Attempt to Hold One-Inch Round Bar-Stock

In 1985, Davenport Machine, Inc. attempted to further "thin out" the radial thickness of the various spindle assembly components (i.e., outer spindle, inner spindle, collet, feed tube, etc.) in an attempt to provide a spindle assembly that would accommodate at one-inch round bar stock and polygonal bar-stock that fit closely within the outer transverse profile of such one-inch diameter round bar stock. This was done at the expense of further reducing the strength and rigidity of the various components of the spindle assemblies.

Here again, the nominal collet seat angle was about 29.5°.

One such machine was built. It was tested to determine its suitability to manufacture parts from such one-inch round bar stock. The machine was never put into commercial production because this machine was unable to produce workpieces of the same quality that had been produced by the "regular" and "oversized" spindle assemblies. The 1985 one-inch spindle assembly simply could not adequately hold the one-inch diameter round bar-stock in the collet against rotational and axial movement when the machining operations were performed. Moreover, the spindle assembly components were so "thinned out" that the one-inch spindle assembly would deflect and deform under forces attributable to the machining operations performed on the larger-diameter workpiece.

Improved Spindle Assemblies (FIGS. 3-4)

Referring now to FIGS. 3-4, the present invention broadly provides improved larger-capacity spindle assemblies and improved collets for use in Davenport® multi-axis screw machines. Many portions of the improved spindle assemblies and collets have portions common to the prior art "regular" and "oversized" capacity spindle assemblies and collets, as well as the 1985 attempt to produce a greater-capacity spindle assembly that could handle and accommodate one-inch round bar stock. Hence, the description of such common parts and components will be abbreviated As best shown in FIG. 3, an improved higher-capacity spindle assembly, generally indicated at 40, is shown as being mounted on a fragmentary portion of a head, again generally indicated at 21, of a Davenport® multi-axis screw machine, again generally indicated at 22. Whereas FIG. 1 showed a relatively-small pie-shaped fragmentary portion of the head with the "oversized" spindle assembly 20 mounted on the head in the 12:00 o'clock position, FIG. 4 provides a larger end view of the head with the improved spindle assembly 40 mounted on the head in the 12:00 o'clock position. FIG. 4 shows the holes 38 in the head at the other angular positions. These holes would accommodate other improved spindle assemblies. FIG. 3 also shows the head as having outermost gear teeth 27, by means of which the head may be rotated about the head axis $x_h$-$x_h$ relative to the frame.

FIG. 4 shows the improved spindle assembly 40 as being mounted on the head in lieu of the "oversized" spindle assembly 20 shown in FIGS. 1-2. Thus, the improved spindle assembly is mounted on the frame for rotation about the horizontal spindle assembly axis $x_s$-$x_s$, and the head, with the improved spindle assembly thereon, is, in turn, mounted for rotation about head axis $x_h$-$x_h$.

The improved spindle assembly has some of the same type of parts as the "oversized" spindle assembly, although its component parts are sized and configured differently. Thus, proceeding radially inwardly in FIG. 4, the improved spindle assembly 40 is shown as having, in pertinent part, a horizontally-elongated outer spindle 41 mounted for rotation relative to the head, a horizontally-elongated inner spindle 42, a collet 43 mounted on the right marginal end portion of the inner spindle, a feed tube 44 arranged within the inner spindle, and a plurality of feed fingers 45 mounted on the feed tube.

The outer spindle, the inner spindle and the feed tube are severally generated about spindle assembly axis $x_s$-$x_s$. The outer spindle 41 is mounted on the head for rotational movement with the head about head axis $x_h$-$x_h$ (see FIG. 4), and for rotational movement about spindle assembly axis $x_s$-$x_s$. The inner spindle 42 is mounted within the outer spindle for rotation with the outer spindle, and for limited axial movement relative to the outer spindle along spindle axis $x_s$-$x_s$. A spindle-moving means, generally indicated at 46, acts between the head and the inner spindle, and is arranged to exert a force that causes the inner spindle to move in one axial direction (i.e., leftwardly in FIG. 4) relative to the outer spindle. The feed tube moving means, generally indicated at 48, acts between the head and the feed tube, for selectively causing the feed tube and feed fingers to selectively reciprocate axially within the inner spindle. The collet 43 is shown as being a horizontally-elongated tubular member having a leftward body 49, and having three integrally-formed circularly-spaced fingers, severally indicated at 50, extending rightwardly therefrom. The three collet fingers have circularly-segmented frusto-conical cam surfaces, severally indicated at 51, on their outer surfaces, that are arranged to engage, an inwardly- and rightwardly-facing frusto-conical cam surface 52 adjacent the right end face 53 of the outer spindle.

Whereas the collet seat angle (i.e., the nominal angle of the frusto-conical cam surfaces with respect to the spindle axis) of the "regular" and "oversized" spindle assemblies, and the 1985 attempt to create an even-larger spindle assembly, was about 29.5°, in the improved spindle assembly, the collet seat angle is greater than 7° and less than or equal to 25°. In a preferred embodiment, the collet seat angle is about 20°±0.5°.

In addition, one or both of the facing frusto-conical cam surfaces 51, 52 may be provided with a low-friction coating to prevent sticking between the cam surfaces and to facilitate a "spring back" (i.e., radial outward movement) of the inwardly-displaced collet fingers when the axial force exerted by the spindle-moving means is release and the inner spindle is permitted to move axially within the outer spindle. If neither of the cam surfaces is provided with an anti-friction coating, the coefficient of friction therebetween would be about 0.25 (i.e., 0.25±0.03). If only one of these cam surfaces 51, 52 is provided with the anti-friction coating, the coefficient of friction between the coated and uncoated cam surfaces is about 0.15 (i.e., 0.15±0.03). However, if both of the cam surfaces 51, 52 are provided with the anti-friction coating, the coefficient of friction therebetween can be reduced to about 0.09 (i.e., 0.09±0.0.03).

Therefore, the present invention provides an improved spindle assembly 40 for a Davenport® multi-axis screw machine 22 having a head 21 rotatably mounted on a frame and being adapted to be angularly indexed through a plurality of successive angular positions and having a plurality of circularly-spaced spindle assemblies 40 mounted on the head, the screw machine being adapted to perform a plurality of machining operations on cantilevered lengths of bar-stock held by the spindle assembles. Each spindle assembly comprises: a rotatable outer spindle 41 having an inwardly-facing cam surface 52; an inner spindle 42 coaxially arranged within the outer spindle for rotation with the outer spindle, and mounted for selective axial movement relative to the outer spindle; a collet 43 mounted on the inner spindle for movement therewith, the collet having an outwardly-facing cam surface 51, 51, 51 engaging the outer spindle cam surface 52 and having a plurality of circularly-spaced fingers 50 adapted to be moved radially inwardly when the inner spindle is moved in one axial direction relative to the outer spindle; spindle-moving means 46 for selectively moving the inner spindle in the one axial direction relative to the outer spindle; a feed tube 44 arranged within the inner spindle for axial movement relative to the inner spindle, the feed tube having a plurality of feed fingers 45 that are adapted to engage a length of bar-stock within the feed tube; and feed-tube-moving means 48 for selectively moving the feed tube and feed fingers in either axial direction relative to the inner spindle; and wherein the movement of the feed tube is adapted to be coordinated with the relative movement of the collet fingers such that the feed fingers may advance the bar-stock forwardly toward the collet when the collet is open.

In one aspect, the improved spindle assembly 40 is adapted to adequately hold one-inch round bar stock, or polygonal bar-stock that fits closely within the transverse profile of such one-inch round bar-stock, in the collet against axial and rotational movement relative thereto that is attributable to machining operations performed on a cantilevered length of bar-stock held by and extending beyond the collet. As used herein, the expression "adequately hold" means to grip the bar-stock tightly to prevent unintended axial, rotational, radial and angular displacement as a result of the forces exerted by the cutting and forming tools during the normal course of machining the exposed, cantilevered bared. Failure to "adequately hold" the bar-stock, and to allow or permit the above displacements would have a negative effect on the ability to hold close tolerances and fine surface finishes heretofore expected and obtained with Davenport® multi-axis screw machines utilizing "regular" and "oversized" capacity spindle assemblies.

In another aspect, the improved spindle assembly 40 is adapted to adequately hold some bar-stock materials, such as those having an AISI "machinability rating" of less than 30%, heretofore considered too difficult to machine on a screw machine.

In still another aspect, the improved spindle assembly 40 has a collet seat angle between the cam surfaces greater than 7° and less than or equal to 25°. In a preferred embodiment, the collet seat angle is about 20°±0.5°.

As noted above, one or both of the facing cam surfaces may be provided with an anti-friction coating to reduce the coefficient of friction therebetween.

Improved Collet Connection (FIGS. 7-8)

FIGS. 5-6 depict the collet 60 and inner spindle 61 of the spindle assembly used in the 1985 spindle assembly that was hoped to be used on one-inch round bar-stock. FIG. 5 shows the collet in exploded aligned relation to the right marginal end portion of the inner spindle, prior to assembly. FIG. 6 is a further-enlarged detail view of the connection therebetween when the collet was threaded onto the inner spindle.

The inner spindle is shown as being a horizontally-elongated tubular member having an axis $x_s$-$x_s$. The right marginal end portion of inner spindle 61 is shown as having an outer horizontal cylindrical surface 62 extending rightwardly to join the outer margin of an annular vertical right end face 63. The inner spindle is shown as including (from left to right in FIG. 5): an inwardly-facing horizontal cylindrical surface 64, an annular undercut portion 65 that extended deeply into the radial side wall of the inner spindle, and an internally-threaded portion 66 continuing rightwardly therefrom to join the inner margin of right end face 63. The undercut portion had a U-shaped cross-section with sharp corners, and was provided to accommodate the tap (not shown) by which threaded portion 66 was provided. Outer cylindrical surface 62 had a nominal diameter of about 1.4255 inches. Inner cylindrical wall 64 had a nominal diameter of 1.21895 inches. Hence, the radial thickness of the inner spindle between surfaces 62, 64 was about 0.10328 inches. The undercut portion 65 had a nominal diameter of about 1.3095 inches, and an axial length of about 0.125 inches. Hence, the radial wall thickness t of the inner spindle radially outwardly of the recess was only about 0.0580 inches. The sharp corners of the undercut portion 65 provided locii of stress concentrations. The inner spindle was made of mild steel. Internally-threaded portion 66 was generated using a 1 5⁄16-24-UNS thread form.

Still referring principally to FIG. 5, the collet 60 is shown as being a horizontally-elongated member generated about spindle axis $x_s$-$x_s$. The collet has an annular vertical left end face 68, an arcuate right end face 69, and an outer surface that sequentially includes (from left to right in FIG. 5): an outwardly-facing horizontal cylindrical surface 70 extending rightwardly from the outer margin of left end face 68, an externally-threaded portion 71 continuing rightwardly from surface 70, an outwardly-facing horizontal cylindrical surface 72, an leftwardly- and outwardly-facing frusto-conical surface 73, an outwardly-facing horizontal cylindrical surface 74, a rightwardly- and outwardly-facing frusto-conical surface 75, an outwardly-facing horizontal cylindrical surface 76, and a leftwardly- and outwardly-facing frusto-conical surface 78 continuing rightwardly therefrom to join the outer margin of right end face 69. Surface 78 converges at an imaginary point P on spindle axis $x_s$-$x_s$, and was arranged at the collet seat angle of about 29.5°. The collet has an inner surface that sequentially includes (again from left to right in FIG. 5): an inwardly-facing horizontal cylindrical surface 79 extending rightwardly from the inner margin of left end face 68, a leftwardly- and inwardly-facing frusto conical surface 80, and an inwardly-facing horizontal cylindrical surface 81 continuing rightwardly therefrom to join the inner margin of right end face 69. Three circumferentially-spaced holes, severally indicated at 82, extend radially between surfaces 76, 79. Three elongated slots, severally indicated at 83, extend radially between surfaces 76, 79, and extend rightwardly from holes 82 to join right end face 69. Thus, collet 60 is a horizontally-elongated tubular member having a tubular body 84, from which three circularly-spaced fingers 85 extend axially rightwardly. Each collet finger 85 is bounded by an outwardly-facing cylindrically-segmented portion of frusto-conical surface 78, by the proximate walls of adjacent slots 83, and by inner surface 81 adjacent the pad 86 of the finger.

As shown in FIG. 6, collet 60 was adapted to be threaded onto the right marginal end portion of inner spindle 61 until the left end face 68 of the thin-walled portion of the collet between surfaces 68, 70, 75 abutted the rightwardly-facing annular vertical wall of undercut portion 65. As the collet was tightened onto the inner spindle, the mating threaded portions 66, 71 and the undercut portion 65 of the collet were placed in tension. Thus, the sharp corners of undercut portion 65 created stress concentrations in the vicinities of the corners. The undercut portion 65 defined a proximate portion of minimal thickness t. Moreover, when the spindle moving means 46 pulled the inner spindle to the left, as seen in FIG. 6, it increased the stress in the thin-thin walled portion of minimal thickness t. Thus, these older collet designs were known to stretch in the vicinity of the thin-walled portion under the loads required to tighten a collet adequately, and to further stretch when large tool loads were applied, diminishing the effective gripping forces. These collet designs were also known to fail by rupturing in the vicinity of the thin-walled portion.

Referring now to FIGS. 7 and 8, the improved collet connection is provided between an improved collet 88 and an improved inner spindle 89. Many portions of the improved collet and inner spindle are common to the earlier version just described. Hence, the same reference numeral will be used to refer to previously-described portions, surfaces or structure.

Thus, the right marginal end portion of improved spindle assembly 89 has outwardly-facing cylindrical surface 62, inwardly-facing cylindrical surface 64, and right end face 63. However, the undercut recess 65 has been eliminated from the improved inner spindle. Rather, the improved inner spindle sequentially includes (from left to right in FIG. 7): an outwardly- and rightwardly-facing frusta-conical surface 90 extending rightwardly from the rightward margin of surface 64, an inwardly-facing horizontal cylindrical surface 91, an internally-threaded portion 92, and an inwardly-facing horizontal cylindrical surface 93 continuing rightwardly therefrom to join the inner margin of right end face 63. Thus, the undercut recess and the thin-walled portion radially outwardly therefrom have been wholly eliminated. Whereas the prior art embodiment shown in FIG. 5 utilized a 24 threads-per-inch UNS thread form, the improved collet connection shown in FIG. 7 utilizes a 28 threads-per-inch UNJ thread form. The UNJ thread form, commonly used in aerospace fasteners, has an enlarged root radius, which is closely controlled, to make the thread less prone to stretching and fatigue failure. In addition, the 28 threads-per-inch thread form has a larger load-carrying capability and a shorter tooth height. This results in a thicker back wall condition, and a stronger and stiffer overall part.

The improved collet 88 eliminates the thin-walled portion of the prior art collet between surfaces 68, 70 and 79. Rather, an externally-threaded portion 94 extends rightwardly from left end face 68. An outwardly-facing horizontal cylindrical surface 95 continues rightwardly from threaded portion 95, and joins the inner margin of a leftwardly-facing annular vertical surface 96. Surface 74 extends rightwardly from the outer margin of surface 96. Another difference lies in the collet set angle. Whereas the collet seat angle in the prior art embodiment shown in FIG. 5 had a collet seat angle of about 29.5°, the arcuately-segmented frusto-conical surfaces 97 of the improved collet have a collet seat angle of surfaces greater than 7° and less than or equal to 25°. In a preferred embodiment, the collet seat angle is about 20°±0.5°, and, more precisely, about 20°10' plus 0°5' or minus 0°0'.

Here again, one or both of the facing frusto-conical cam surfaces can be provided with a suitable low-friction coating to prevent sticking, and to facilitate the "spring back" of the inwardly-deformed fingers when the axial force exerted on the inner spindle by the spindle moving means is released. If only one of engaged cam surfaces is provided with a low-friction coating, the coefficient of friction therebetween will be reduced to about 0.15. However, if both of the engaged cam surfaces are provided with the low-friction coating, the coefficient of friction may be further reduced to about 0.09.

Therefore, this aspect provides another improvement for a Davenport® multi-axis screw machine having a collet adapted to be selectively mounted on a spindle; said spindle having: a forwardly-facing end face, a cylindrical outer surface extending rearwardly from the outer margin of spindle end face, an internally-threaded portion extending rearwardly from the inner margin of said spindle end face, an inner cylindrical surface axially spaced from said spindle threaded portion, a radially-thickened portion of said spindle being defined between said spindle inner and outer cylindrical surfaces; said collet having: a rearwardly-facing end face, an externally-threaded portion extending forwardly from the outer margin of said collet end face, a rearwardly-facing shoulder surface, an outer cylindrical surface extending forwardly from said shoulder surface, and an inner cylindrical surface extending forwardly from the inner margin of said collet end face.

The improvement may include: said spindle having a frusto-conical surface extending forwardly and outwardly from said spindle inner cylindrical surface.

The improvement may further include: an inwardly-facing rear cylindrical surface extending forwardly from the outer margin of said frusto-conical surface to join the rear margin of said spindle threaded surface, and/or an inwardly-facing forward cylindrical surface extending forwardly from the forward margin of said spindle threaded surface to join the inner margin of said spindle end face. The collet is adapted to be threadedly mounted on said spindle until said spindle end face abuts said collet shoulder. The collet end face does not bear against any portion of said spindle when said collet is threaded into engagement with said spindle. The invention shifts the tensile forces generated by the tightening of the collet threads on the threads of the inner spindle from the thin-section of the low-strength mild steel spindle to the high-strength tool steel collet. Moreover, by changing the abutment shoulder from the end face of the collet to the end face of the inner spindle, the bearing area and load-carrying capacity of the improved interface has about a six-fold increase in load-carrying capacity (i.e., 0.054/0.009≈a six-fold increase).

Reference to a Davenport® multi-axis screw machine in the claims is intended to be a limitation on the scope of the claims.

Therefore, while preferred forms of the invention have been shown and described, and several changes and modifications thereof discussed, persons skilled in this art will readily appreciate that various additional changes and modifications may be made without departing from the spirit of the invention, as defined and differentiated in the following claims.

What is claimed is:

1. A spindle assembly for a Davenport® multi-axis screw machine having a head rotatably mounted on a frame and being adapted to be angularly indexed through a plurality of successive angular positions and having a plurality of circularly-spaced spindle assemblies mounted on said head, said screw machine being adapted to perform a plurality of machining operations on cantilevered lengths of bar-stock held by said spindle assembles, each spindle assembly comprising:
- a rotatable outer spindle having an inwardly-facing cam surface;
- an inner spindle coaxially arranged within said outer spindle for rotation with said outer spindle, and mounted for selective axial movement relative to said outer spindle;
- a collet mounted on said inner spindle for movement therewith, said collet having an outwardly-facing cam surface engaging said outer spindle cam surface and having a plurality of circularly-spaced fingers adapted to be moved radially inwardly when said inner spindle is moved in one axial direction relative to said outer spindle;
- spindle-moving means for selectively moving said inner spindle in said one axial direction relative to said outer spindle;
- a feed tube arranged within said inner spindle for axial movement relative to said inner spindle, said feed tube having a plurality of feed fingers that are adapted to engage a length of bar-stock within said feed tube;
- feed-tube-moving means for selectively moving said feed tube and feed fingers in either axial direction relative to said inner spindle;
- wherein the movement of said feed tube is adapted to be coordinated with the relative movement of said collet fingers such that said feed fingers may advance said bar-stock forwardly toward said collet when said collet is open; and
- wherein said spindle assembly is operatively adapted to adequately hold one-inch round bar-stock in said collet against axial and rotational movement relative thereto attributable to machining operations performed on a cantilevered length of said bar-stock held by and extending beyond said collet.

2. A spindle assembly as set forth in claim 1 wherein said spindle assembly is operatively adapted to hold polygonal or amorphously-shaped bar-stock that fits closely within the transverse profile of said one-inch round bar-stock.

3. A spindle assembly as set forth in claim 1 wherein said bar-stock includes some materials heretofore considered too difficult to machine on a screw machine.

4. A spindle assembly as set forth in claim 3 wherein said bar-stock includes some materials having an AISI "machinability rating" of less than 30%.

5. A spindle assembly as set forth in claim 1 wherein the collet seat angle between said cam surfaces is greater than 7° and less than or equal to 25°.

6. A spindle assembly as set forth in claim 5 wherein said collet seat angle is about 20°±0.5°.

7. A spindle assembly as set forth in claim 1 wherein one of said inner and outer spindle cam surfaces is coated with a low-friction material.

8. A spindle assembly as set forth in claim 7 wherein the coefficient of friction between said cam surfaces is about 0.15.

9. A spindle assembly as set forth in claim 8 wherein both of said inner and outer spindle cam surfaces are coated with a low-friction material.

10. A spindle assembly as set forth in claim 9 wherein the coefficient of friction between said cam surfaces is about 0.09.

11. A spindle assembly for a Davenport® multi-axis screw machine having a head rotatably mounted on a frame and being adapted to be angularly indexed through a plurality of successive angular positions and having a plurality of circularly-spaced spindle assemblies mounted on said head, said screw machine being adapted to perform a plurality of machining operations on cantilevered lengths of bar-stock held by said spindle assembles, each spindle assembly comprising:
- a rotatable outer spindle having an inwardly-facing cam surface;
- an inner spindle coaxially arranged within said outer spindle for rotation with said outer spindle, and mounted for selective axial movement relative to said outer spindle;
- a collet mounted on said inner spindle for movement therewith, said collet having an outwardly-facing cam surface engaging said outer spindle cam surface and having a plurality of circularly-spaced fingers adapted to be moved radially inwardly when said inner spindle is moved in one axial direction relative to said outer spindle;
- spindle-moving means for selectively moving said inner spindle in said one axial direction relative to said outer spindle;
- a feed tube arranged within said inner spindle for axial movement relative to said inner spindle, said feed tube having a plurality of feed fingers that are adapted to engage a length of bar-stock within said feed tube;
- feed-tube-moving means for selectively moving said feed tube and feed fingers in either axial direction relative to said inner spindle;
- wherein the movement of said feed tube is adapted to be coordinated with the relative movement of said collet fingers such that said feed fingers may advance said bar-stock forwardly toward said collet when said collet is open; and
- wherein said spindle assembly is operatively adapted to adequately hold bar-stock formed of some materials heretofore considered too difficult to machine in a screw machine.

12. A spindle assembly as set forth in claim 11 wherein said spindle assembly is operatively adapted to adequately hold one-inch round bar-stock in said collet against axial and rotational movement relative thereto attributable to machining operations performed on a cantilevered length of said bar-stock extending beyond said collet.

13. A spindle assembly as set forth in claim 12 wherein said spindle assembly is operatively adapted to hold polygonal or amorphously-shaped bar-stock that fits closely within the transverse profile of said one-inch round bar-stock.

14. A spindle assembly as set forth in claim 11 wherein the collet seat angle between said cam surfaces is greater than 7° and less than or equal to 25°.

15. A spindle assembly as set forth in claim 14 wherein said collet seat angle is about 20°±0.5°.

16. A spindle assembly as set forth in claim 11 wherein one of said inner and outer spindle cam surfaces is coated with a low-friction material.

17. A spindle assembly as set forth in claim 11 wherein the coefficient of friction between said cam surfaces is about 0.15.

18. A spindle assembly as set forth in claim 17 wherein both of said inner and outer spindle cam surfaces are coated with a low-friction material.

19. A spindle assembly as set forth in claim 18 wherein the coefficient of friction between said cam surfaces is about 0.09.

20. In a Davenport® multi-axis screw machine having a head rotatably mounted on a frame and being adapted to be angularly indexed between a plurality of successive angular positions and having a plurality of circularly-spaced spindle assemblies mounted on said head, said screw machine being adapted to perform a plurality of machining operations on cantilevered lengths of bar-stock held by said spindle assembles, said screw machine having a rotatable outer spindle having an inwardly-facing cam surface, having an inner spindle arranged within said outer spindle for rotation with said outer spindle and mounted for selective coaxial movement relative to said outer spindle, having a collet mounted on said inner spindle for movement therewith, said collet having an outwardly-facing cam surface engaging said outer spindle cam surface and having a plurality of circularly-spaced fingers adapted to be moved radially inwardly when said cam surfaces engage one another and said inner spindle is moved in one axial direction relative to said outer spindle, and having spindle-moving means for selectively moving said inner spindle in said one axial direction relative to said outer spindle; the improvement which comprises:

the collet seat angle between said inner and outer spindle cam surfaces being greater than 7° and less than or equal to 25° so as to adequately hold bar-stock in said collet against axial and rotational movement relative thereto attributable to machining operations performed on a cantilevered portion of said bar-stock extending beyond said collet.

21. The improvement as set forth in claim 20 wherein said collet seat angle is about 20°±0.5°.

22. The improvement as set forth in claim 20 wherein said bar-stock includes up to and including ⅝-inch round bar-stock.

23. The improvement as set forth in claim 20 wherein said bar-stock includes up to and including ¹³/₁₆-inch round bar-stock.

24. The improvement as set forth in claim 20 wherein said bar-stock includes up to and including one-inch round bar-stock.

25. The improvement as set forth in claim 20 wherein said bar-stock includes some materials heretofore considered too difficult to machine on a screw machine.

26. The improvement as set forth in claim 25 wherein said bar-stock includes materials having an ANSI "machinability rating" of less than 30%.

27. The improvement as set forth in claim 20 wherein one of said inner and outer spindle cam surfaces is coated with a low-friction material.

28. The improvement as set forth in claim 27 wherein the coefficient of friction between said cam surfaces is about 0.15.

29. The improvement as set forth in claim 20 wherein both of said inner and outer spindle cam surfaces are coated with a low-friction material.

30. The improvement as set forth in claim 29 wherein the coefficient of friction between said cam surfaces is about 0.09.

31. A Davenport® multi-axis screw machine having a collet adapted to be selectively mounted on a spindle;

said spindle having:
  a forwardly-facing end face,
  a cylindrical outer surface extending rearwardly from the outer margin of spindle end face,
  an internally-threaded portion extending rearwardly from the inner margin of said spindle end face,
  an inner cylindrical surface axially spaced from said spindle threaded portion,
  a radially-thickened portion of said spindle being defined between said spindle inner and outer cylindrical surfaces;

said collet having:
  a rearwardly-facing end face,
  an externally-threaded portion extending forwardly from the outer margin of said collet end face,
  a rearwardly-facing shoulder surface,
  an outer cylindrical surface extending forwardly from said shoulder surface, and
  an inner cylindrical surface extending forwardly from the inner margin of said collet end face;

wherein the improvement comprises:
said spindle having a frusto-conical surface extending forwardly and outwardly from said spindle inner cylindrical surface.

32. A Davenport® multi-axis screw machine as set forth in claim 31, wherein the improvement further comprises:
  an inwardly-facing rear cylindrical surface extending forwardly from the outer margin of said frusto-conical surface to join the rear margin of said spindle threaded surface.

33. A Davenport® multi-axis screw machine as set forth in claim 32 wherein the improvement further comprises:
  an inwardly-facing forward cylindrical surface extending forwardly from the forward margin of said spindle threaded surface to join the inner margin of said spindle end face.

34. A Davenport® multi-axis screw machine as set forth in claim 31 wherein said collet is adapted to be threadedly mounted on said spindle until said spindle end face abuts said collet shoulder.

35. A Davenport® multi-axis screw machine as set forth in claim 31 wherein said collet end face does not bear against any portion of said spindle when said collet is threaded into engagement with said spindle.

36. A Davenport® mufti-axis screw machine as set forth in claim 31 wherein the diameters of said spindle and collet outer cylindrical surfaces are substantially the same.

37. A Davenport® multi-axis screw machine as set forth in claim 31 wherein the diameters of said spindle and collet inner cylindrical surfaces are substantially the same.

38. A Davenport® multi-axis screw machine as set forth in claim 31 wherein said spindle and collet threaded portions have a UNJ thread form.

39. A spindle assembly as set forth in claim 11 wherein said bar-stock is formed of a material having an ANSI "machinability rating" of less than 30%.

* * * * *